United States Patent [19]

Catros et al.

[11] Patent Number: 4,613,894
[45] Date of Patent: Sep. 23, 1986

[54] METHOD AND DEVICE FOR DETECTION OF MOVING POINTS IN A TELEVISION IMAGE FOR DIGITAL TELEVISION SYSTEMS PROVIDING BIT-RATE COMPRESSION, WITH CONDITIONAL-REPLENISHMENT

[75] Inventors: Jean-Yves Catros; Franck Chapuis, both of Rennes; Francois Malo-Renault, Cesson-Sevigne, all of France

[73] Assignee: Thomson-CSF, Paris, France

[21] Appl. No.: 640,984

[22] Filed: Aug. 15, 1984

[30] Foreign Application Priority Data

Aug. 30, 1983 [FR] France ............................. 83 13910

[51] Int. Cl.[4] .............................................. H04N 7/12
[52] U.S. Cl. ...................................... 358/13; 358/135; 358/136
[58] Field of Search ................. 358/13, 135, 136, 138, 358/133

[56] References Cited

U.S. PATENT DOCUMENTS 4,437,119  3/1984  Matsumoto ..................... 358/136
4,546,386  10/1985  Matsumoto ..................... 358/136
4,567,519  1/1986  Richard ........................... 358/135

Primary Examiner—Michael A. Masinick
Attorney, Agent, or Firm—Cushman, Darby & Cushman

[57] ABSTRACT

The method consists in computing a luminance and/or chrominance gradient indicator ($I_g$) at each point of the image, in computing a threshold value ($S(X_o)$) as a function of each gradient obtained, in measuring the inter-image luminance and/or chrominance difference of each point of the image, in comparing the inter-image difference obtained at each point with the corresponding computed threshold value, in applying the result of the comparison to the input of a density-filtering device in order to detect the density of moving points in proximity to each scanned point and to compare the density obtained in respect of each point with a predetermined density threshold value in order to provide an indication of moving points when the density at each point considered exceeds the predetermined density threshold value.

10 Claims, 4 Drawing Figures

METHOD AND DEVICE FOR DETECTION OF MOVING POINTS IN A TELEVISION IMAGE FOR DIGITAL TELEVISION SYSTEMS PROVIDING BIT-RATE COMPRESSION, WITH CONDITIONAL-REPLENISHMENT

BACKGROUND OF THE INVENTION

1. Field of the Invention

The invention relates to a method and a device for detection of moving points in a television image for digital television systems providing bit-rate compression, with conditional-replenishment, in which the images received are updated or replenished only in respect of the significant points of the image which are in motion.

The invention is more particularly applicable to the construction of adaptive-threshold motion detectors for reducing parasitic detections caused by inter-image noise in digital television by providing a method of density filtering which makes it possible to filter any binary television image and/or to obtain uniform bridged areas by eliminating small zones or patches which are considered undesirable in these areas.

2. Description of the Prior Art

Methods of detection of moving points in an image for compressing the bit rate of coded television images between transmitters and receivers are already known and mostly consist in selecting data relating to the image points which have changed to an appreciable extent from one image to the next for the purpose of transmitting said data over the transmission channel which connects the transmitter to the different television receivers.

Movement-detecting devices or so-called motion detectors are also well-known and, in the case of each television image, carry out segmentation between the stationary and moving areas of the image.

In principle, a comparison of the difference in inter-image luminance of similar points having a single threshold is sufficient to separate the two types of areas. In practice, however, the separation proves to be imperfect, in the first place by reason of the analog or digital noise which is always present in an image sequence and gives rise to confusions in the static or moving state of the image points and in the second place by reason of the bit-rate requirements imposed on the transmission channel.

The difficulty arises from the fact that, by modifying the adjustment of the single detection threshold of existing motion detectors, it is impossible to obtain good rendition of the moving areas and a low bit rate in the transmission channel. In fact, by increasing the detection threshold in order to avoid detection of background noise, poorly reproduced moving areas are obtained at the level of the decoder of the receiver whereas, by reducing the detection threshold in order to produce correct restitution of the movements of the image, an increasing quantity of background noise is allowed to pass, thereby increasing the transmitted information or data bit rate.

SUMMARY OF THE INVENTION

The object of the invention is to overcome the disadvantages mentioned in the foregoing.

To this end, the invention relates to a method for detection of moving points in a television image for digital television systems providing bit-rate compression, with conditional-replenishment. The method essentially consists in computing a luminance and/or chrominance gradient indicator at each point of the image, in computing a threshold value as a function of each gradient obtained, in measuring the inter-image luminance and/or chrominance difference of each point of the image, in comparing the inter-image difference obtained at each point with the corresponding computed threshold value, in applying the result of the comparison to the input of a density-filtering device for detecting the density of moving points in proximity to each scanned point and in comparing the density obtained at each scanned point with a predetermined density threshold in order to declare each scanned point in motion when the density corresponding to this point exceeds the predetermined density threshold value.

The invention is also directed to a device for the practical application of the method submarized in the foregoing.

The method and the device in accordance with the invention have the chief advantage of permitting better rendition of the moving areas. These objectives are achieved primarily by virtue of the fact that the threshold of comparison of the inter-image difference is no longer fixed but varies as a function of the area within which the inter-image difference is detected and that this threshold is higher in texture areas or contour areas than in the uniform areas of the image. This has the effect of preventing parasitic detections arising from instability of sampling signals on the contours and makes it possible to avoid the so-called "dirty window" degradation phenomenon. The remaining parasitic noise is filtered by means of the density filter.

BRIEF DESCRIPTION OF THE DRAWINGS

Other features of the invention will be more apparent upon consideration of the following description and accompanying drawings, wherein.

DESCRIPTION OF THE PREFERRED EMBODIMENT

Figure 1:
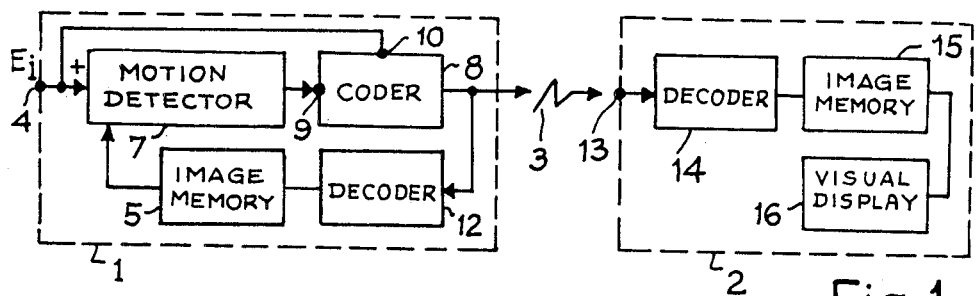
FIG. 1 is a general block diagram showing a television-image transmission system providing conditional-replenishment bit-rate compression.

In order to avoid detection of background noise in contour or texture areas of the image, the aim of the invention is to provide a method whereby the threshold of detection of the moving points of the image within these areas is automatically raised. A first step of the method accordingly consists in measuring the values $X_i$ of luminance and/or chrominance of each point of the image in order to compute at each point $P_o$ in the current and/or preceding image a gradient indicator $I_g$ defined for example by an operation of the form $$I_g = \left[ \sum_{i=1}^{N} |X_o - X_i| \right] \times \frac{1}{N} \quad (1)$$

or else of the form $$I_g = \max_{i=1\ldots N} \{|X_o - X_i|\} \tag{2}$$

where:

$X_o$ designates the luminance and/or chrominance of the point $P_o$, $X_i$ designates the luminance and/or the chrominance of a point $P_i$ adjacent to the point $P_o$ which precedes or directly follows the point $P_o$ in predetermined directions of the image, for example in its horizontal or vertical directions, $|X_o - X_i|$ designates the absolute value of the difference in luminance and/or chrominance of the adjacent points $P_o$ and $P_i$, N designates the number of adjacent points.

In another alternative embodiment of the invention, the first step of the method can also consist in comparing, at each scanned point of the current image, the maximum difference in luminance and/or chrominance between the current scanned point and each of its adjacent points, with the maximum difference in luminance and/or chrominance of the point corresponding to the current point scanned in the preceding image together with those adjacent points which are also included in the preceding image, and in selecting as gradient indicator the maximum difference obtained in respect of the weakest point scanned in either of the two images. This method offers an advantage in that, by choosing the smallest difference, it is possible to obtain a lower comparison threshold in the remaining steps of the method, thus avoiding any loss of points which are really in motion.

The second step of the method consists in assigning to each point $P_o$ of the image a threshold value $S(X_o)$ as a function of the gradient indicator computed at the time of the first step on condition that the threshold $S(X_o)$ remains between two minimum and maximum threshold values $S_{MIN}$, $S_{MAX}$ in order not to code excessive noise in the uniform areas and in order not to lose areas which have really moved such as moving areas which have contours or textures. By way of application of this principle, the threshold value $S(X_o)$ is determined in such a manner, for example, as to be proportional to the gradient indicator $I_g$ in accordance with the relations $$S(X_o) = k \times I_g \tag{3}$$

with $$S_{MIN} \leq S(X_o) \leq S_{MAX} \tag{4}$$

and $$k \in [0,1]$$

The third step of the method consists in computing in respect of each point $P_i$ the inter-image difference in luminance and/or chrominance and in comparing the difference obtained with the corresponding threshold value $S(X_i)$ which has previously been computed in the preceding step in order to obtain a first binary image of the image areas which are assumed to be in motion.

Finally, the fourth step of the method consists in applying the comparison result obtained in the preceding step to the input of a density-filtering device in order to detect the density of points which are assumed to be in motion and in proximity to each scanned image-point within a space around each scanned point and in comparing the density obtained at each point $P_i$ with a predetermined density threshold in order to provide a moving-point indication when the density detected around each scanned point exceeds a predetermined reference threshold.

By way of example, the space surrounding each scanned point within which is estimated the density of the moving points in proximity to the scanned point can be defined by a window of size $p \times q$, where p designates for example the number of points taken into consideration in the horizontal direction and where q designates the number of points taken into consideration in the vertical direction.

Inasmuch as the density of points detected in the third step corresponding to the parasitic image-background noise is usually lower than the density corresponding to the movement, the fourth step of the method provides an effective means for ensuring correct segmentation of the image into fixed and moving areas.

Estimation of density is carried out in a simple manner by counting the number of points having a predetermined binary value (0 or 1) within the window, this number being obtained in the third step. In accordance with this procedure, the binary-value density j at any given point $P_i$ will be expressed for example by the relation $$dj_{(i)} = \frac{\Sigma \text{ of points of value } j \text{ in the window}}{q \times p} \tag{5}$$

with $j = 1$ or 0.

Under these conditions, the relation $$dl_{(i)} = 1 - dO_{(i)} \tag{6}$$

is always satisfied.

It will be assumed in the description which now follows that the value $j=1$ applies to the moving points.

The filtering operation can be performed in accordance with two methods. In a first method, the density $dl_{(i)}$ of moving points for which $j=1$ is compared with a predetermined reference density threshold $S_d$ and if $dl_{(i)} > S_d$, the point $P_i$ considered is declared in motion.

In accordance with a second method, a two-dimensional bridging operation is performed in addition to the density-filtering operation described earlier. In this case, the density is computed by estimating the density in the case of all the points, namely those for which $j=0$ and those for which $j=1$.

As in the preceding case, if $dl_{(i)} > S_d$ where $S_d$ is a predetermined reference density threshold, the point $P_i$ is considered to be in motion. In the contrary case, the point $P_i$ is declared as fixed. Either of these methods can be adopted.

A television image transmission system providing bit-rate compression, with conditional-replenishment, for the practical application of the method in accordance with the invention is illustrated in FIG. 1. The system comprises in known manner a transmission unit 1, a receiving unit 2, said units being linked to each other by means of a transmission channel 3. The transmission unit 1 comprises an input 4 to which are applied digital samples $E_i$ of video signals delivered by a television camera which is external to the system and is not shown in the drawings. Said transmission unit 1 further comprises an image memory 5, a motion detector 7 coupled via one input to the output of the memory 5 and via another input to the input 4 of the transmission unit 1, and a coder 8. The inputs 9 and 10 of said coder are coupled respectively on the one hand to the output of the motion detector 7 and on the other hand to the input 4 of said transmission unit 1, the output of said coder being coupled to the transmission channel 3. The transmission unit 1 further comprises a decoder 12, the input of which is coupled to the output of the coder 8 and the output of which is coupled to the input of the image memory 5. The input 13 of the receiving unit 2 is coupled to the transmission channel 3 and comprises a decoder 14 and an image memory 15 which are connected in series between the input point 13 and a visual display device 16.

By means of the motion detector 7, the system shown in FIG. 1 makes it possible to evaluate the interimage difference in the luminance and/or chrominance information which accompanies each image point to be coded and the detector decides which image points are to be declared as having changed from one image to the next. Under the control of the motion detector 7, the coder 8 computes in respect of the points which have changed a coded luminance and address datum which it transmits over the link channel 3 in known manner by means of a transmission unit (not shown in the drawings). At the receiver, the coded luminance and address bits are decoded by the decoder 14, then transmitted to the interior of the image memory 15 in order to refresh the image which has previously been stored in this memory. By means of the decoder 12 of the transmission unit, the information available at the transmitter is the same as the information decoded at the receiver by the decoder 14 whilst the preceding image which has also been stored in the image memory 5 of the transmission unit can be refreshed. The result thereby achieved is that, if no error occurs, the same image coded in binary form is available at the same moment in the image memories 5 and 15.

Figure 2:
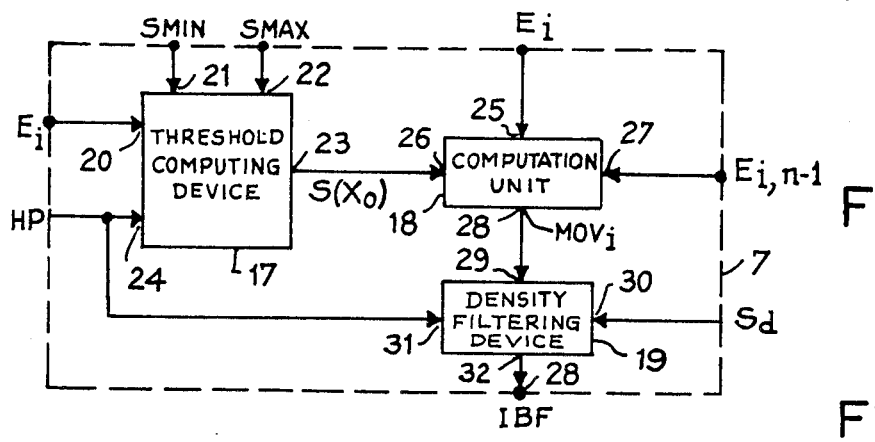
FIG. 2 is a block diagram showing the motion detector in accordance with the invention.

A general arrangement of the motion detector 7 in accordance with the invention is shown in the schematic diagram of FIG. 2. The motion detector 7 illustrated in FIG. 2 comprises a device 17 for computing the threshold to be employed in order to detect the motion of each image point, a unit 18 for computation of the inter-image difference and comparison, said unit being responsive to the threshold computed by the threshold-computing device 17. The motion detector further comprises a density-filtering device 19 for detecting the density of moving points located in close proximity to each scanned point and comparing the density obtained around each point with a predetermined density threshold in order to define the indication of moving points on the basis of this threshold. The sample $E_i$ of the video signal being scanned is applied to the input 20 of the threshold-computing device 17 and is employed for computing the local gradient indicator $I_g$ in accordance with the first step of the method of the present invention, and for computing a threshold value $S(X_o)$ as a function of the value of the gradient obtained. By way of example, this threshold is defined in accordance with relation (3) of the method described earlier while making sure, again in accordance with this method, that the threshold value obtained is between two threshold limits $S_{MAX}$ and $S_{MIN}$ applied by devices (not shown) which are external to the motion detector. The values $S_{MAX}$ and $S_{MIN}$ are defined as indicated earlier in such a manner as to avoid excessive coding of noise in the uniform areas of the image and to avoid any loss of areas which have really moved as could be the case, for example, with moving areas having contours or textures. The computed threshold information $S(X_o)$ is obtained at the output 23 of the threshold-computing device in synchronism with point clock signals HP which are applied to the input 24 of the computing device 17 and the period of which corresponds in time to the interval between two successive image samples $E_i$ and $E_{i+1}$.

The computation unit 18 has three inputs designated respectively by the reference numerals 25, 26 and 27. The input 25 receives the current video signal sample $E_{i,n}$. The input 26 is connected directly to the output 23 of the computing device 17 which transmits the computed threshold value $S(X_o)$. The input 27 receives a signal sample corresponding to the scanned image sample of the preceding image $E_{i,n-1}$. The output 28 of the computation unit 18 is connected to the input 29 of the density-filtering device 19, the other two inputs 30 and 31 of which receive respectively a binary information $S_d$ corresponding to the estimated density reference threshold as well as the clock signals HP already applied to the input 24 of the threshold-computing device 17. The output 32 of the density-filtering device 19 delivers a signal IBF having a "0" or "1" logic level which indicates the state of motion or non-motion of the scanned image point.

Figure 3:
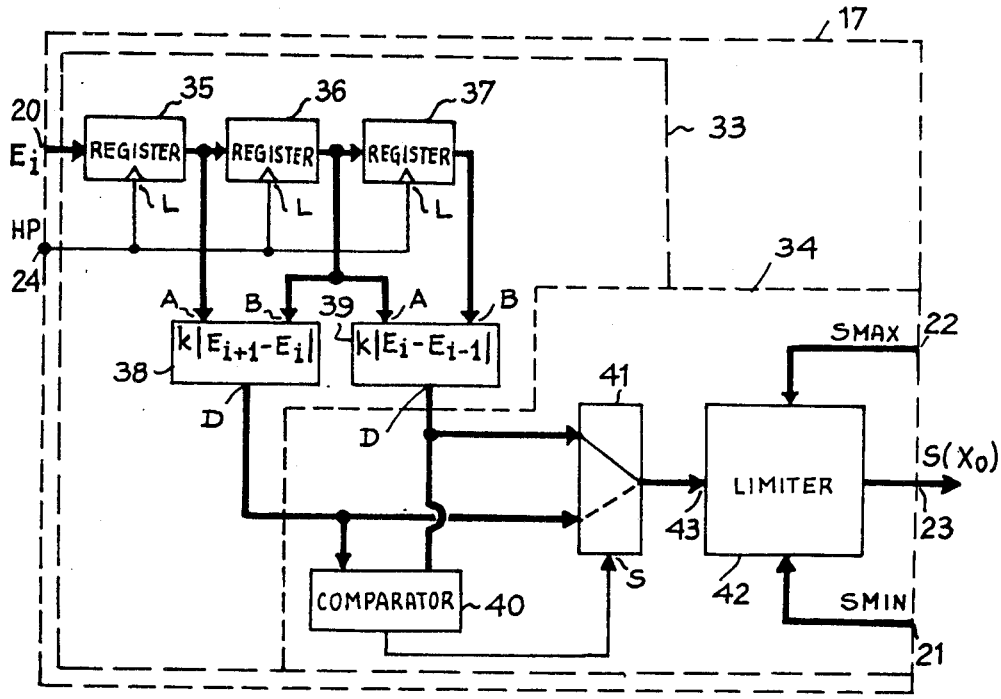
FIGS. 3 and 4 are block diagrams showing in detail one embodiment of the motion detector in accordance with the invention.

One possible form of construction of the threshold-computing device 17 is illustrated in FIG. 3. This device comprises a measuring unit 33 and a computing device 34 each represented in the figure by a frame shown in dashed outline. The measuring unit 33 has the function of measuring the luminance gradient at each point of the image by making comparisons between the luminance and/or chrominance sample of each point applied to the input 20 of the device 17 and the adjacent samples located on the same image line. This measurement is performed by means of registers 35, 36 and 37 and computing means 38 and 39. The registers 35, 36 and 37 are each composed of eight flip-flops, for example. Each flip-flop is capable of storing 1 bit in order to permit storage of one digital sample formed of eight bits within each register. The registers 35, 36, 37 are mounted in series. The outputs of the flip-flops of the register 35 are connected to the corresponding inputs of the register 36 and the outputs of the flip-flop of register 36 are connected to the corresponding inputs of the register 37. The inputs of the register 35 are connected to the input 20 of the threshold-computing device 17 and the control inputs L of each register 35, 36 and 37 are connected to the input 24 of the threshold-computing device in order that each luminance sample applied to the input 20 may be transferred successively into each register 35, 36 and 37. In the embodiment of FIG. 3, the computing means 38, 39 are constituted by PROM memories (programmable read-only memories) each having address inputs A and B and a data output D. The address inputs A of the memories 38 and 39 are connected respectively to the outputs of the registers 35 and 36 and the address inputs B are connected respectively to the outputs of the registers 36 and 37. The memories 38 and 39 each contain tables of absolute values which are addressable respectively from the contents of the registers 35 and 36 and from the contents of the registers 36 and 37. The memories 38 and 39 restitute on their outputs D respectively a datum equal to $k|E_{i+1}-E_i|$ and a datum equal to $k|E_i-E_{i-1}|$ where k is any value which belongs to the interval [0,1] and where $E_{i+1}$, $E_i$ and $E_{i-1}$ designate respectively the contents of the registers 35, 36 and 37.

The threshold-computing device 34 comprises a comparator 40, a switching device 41, and a limiting unit 42. The comparator 40 has two inputs connected respectively to the outputs D of the memories 38 and 39 and transmits the result of the comparison to the control input S of the switching device 41. Said switching device transmits to the input 43 of the limiter 42 either the datum obtained at the output of the memory 38 when the relation $k|E_{i+1}-E_i| \geq k|E_i-E_{i-1}|$ controlled by the comparator 40 is satisfied or the datum obtained at the output of the memory 39 when the reverse relation is satisfied.

The threshold value $S(X_o) = \text{Max}[k|E_{i+1}-E_i|, k|E_i-E_{i-1}|]$ thus computed is transmitted to the limiting unit 42 in order to be compared with the threshold values $S_{MAX}$ and $S_{MIN}$ obtained from the inputs 21 and 22 of the threshold-computing device 17.

The limiter 42 transmits the computed value $S(X_o)$ to the inter-image difference computation and comparison unit 18 while maintaining this value between the two threshold values $S_{MAX}$ and $S_{MIN}$ in accordance with the relation:

$$S_{MIN} \leq S(X_o) \leq S_{MAX}$$

As mentioned earlier, the minimum threshold value $S_{MIN}$ is chosen so as to avoid excessive coding of noise in the uniform areas of the image and the value $S_{MAX}$ is chosen so as to avoid any loss of areas having contours or textures which have moved to a considerable extent.

Figure 4:
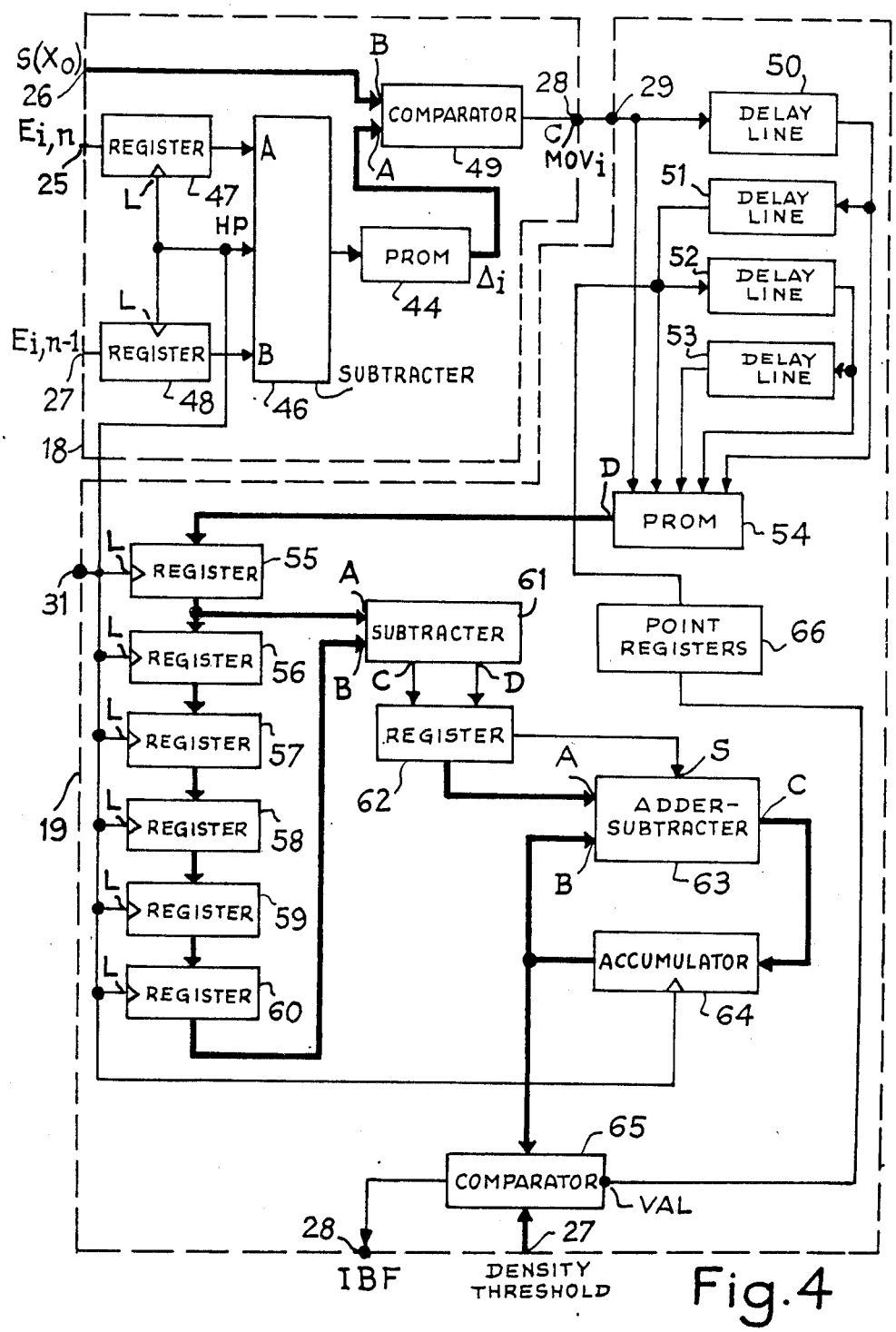

The computation unit 18 and the density-filtering device 19 are shown in FIG. 4. The computation unit 18 computes the absolute value of the inter-image difference $\Delta_i = |E_{i,n} - E_{i,n-1}|$ which represents at each point $P_i$ the value of the difference in luminance between the point and its corresponding point of the preceding image and compares each inter-image difference $\Delta_i$ obtained at the density threshold $S(X_o)$ provided by the threshold-computing device 17.

In the expression given above, $E_{i,n}$ represents the value of luminance of the point $P_i$ of the image n and $E_{i,n-1}$ represents the value of luminance of the corresponding point $P_i$ of the image $n-1$.

In the embodiment shown in FIG. 4, the computation unit 18 comprises a PROM (programmable read-only memory) 44 which contains a table of inter-image differences $\Delta_i$. The memory 44 is connected by means of its address inputs to the output of a subtracter 46, the inputs A and B of which are connected respectively to the outputs of two registers 47 and 48. Under these conditions, the binary values of the luminance samples $E_{i,n}$ and $E_{i,n-1}$ which are applied to the inputs 25 and 27 of the computation unit 18 are stored at the frequency of the point clock signals HP within the registers 47 and 48 respectively. The contents of the registers 47 and 48 are subtracted from each other at the frequency of the point clock signals HP by the subtracter 46 which delivers a binary number in the form of a two's complement of the difference between the contents of the two registers 47 and 48. This result is employed for addressing the contents of the memory 44 which delivers on its data lines the inter-image difference $\Delta_i$ corresponding to the binary number obtained at the output of the subtracter 44.

The inter-image difference $\Delta_i$ is applied to the input A of a comparator 49. The threshold value $S(X_o)$ which was previously computed by the threshold-computing device 17 is applied to the input B of the comparator 49 which delivers at its output a signal $MOV_i$ having a binary value 1 when the difference $\Delta_i$ is greater than the computed threshold value $S(X_o)$ and having a binary value 0 when this is not the case.

If the signal $MOV_i$ thus obtained could be employed directly in order to control the coding of moving areas, a fairly accurate image of said moving areas could thus be obtained, especially when the image background has a textured structure or substantial contours. However, in order to obtain good picture quality in uniform moving areas, the device described in the foregoing calls for a low detection threshold $S_{MIN}$, thus resulting in detection having a high background noise. In order to overcome this disadvantage, the binary image of the moving points as obtained at the output of the computation unit 18 is filtered by the density-filtering device 19, one embodiment of which is illustrated in FIG. 4.

The density-filtering device 19 shown in FIG. 4 comprises an array of delay lines 50, 51, 52, 53 mounted in series at the output of the comparator 49. Each line has a delay equivalent to the time of scanning of the digital samples which are scanned in one line of the image. The outputs of the delay lines 50 to 53 are connected respectively to the address inputs of a PROM 54 (programmable read-only memory) of the type containing a density table defined by means of relation (5). The data outputs D of the memory 54 are connected to the respective inputs of a first register 55 of an array of registers 55 to 60 which are all mounted in series so as to constitute a stack of shift registers, the operation of which is based on the "first-in, first-out" principle designated by the abbreviation FIFO. These registers are operated via their loading input L at each pulse of the signal HP in order to transfer their contents to the following register. The outputs of the registers 55 and 60 are coupled to the inputs A and B of a subtracter 61, the output C of which supplies the difference between the contents of the registers 55 and 60. The output D of said subtracter delivers the sign of this difference to the respective inputs of the register 62. The output of the register 62 is coupled to the input A of an adder-subtracter 63, the input B of which is coupled to the output of an accumulator-register 64, the input of said accumulator-register 64 being coupled to the output of the adder-subtracter 63. As a function of the sign registered within the register 62, the adder-subtracter 63 adds or subtracts the two operands delivered respectively by the outputs of the register 62 and of the accumulator 64. The output of said accumulator 64 is connected to a first input of a comparator 65. There is applied to the second input of said comparator 65 a predetermined binary value corresponding to a density reference threshold value with respect to which the moving-point densities are compared, said binary value being transmitted by an external device (not shown in the figure). The comparator 65 consequently compares at each instant the contents of the accumulator 64 with the density reference threshold applied to its second input so as to deliver at its output a signal IBF which is applied to the terminal 28 of the motion detector which indicates whether the point whose density has been computed is or is not a moving point. When the density computed in respect of an image point $P_i$ contained in the accumulator 64 is higher than the reference density threshold, the signal IBF delivered by the comparator 65 assumes the logical value 1 in order to indicate that the corresponding point is a moving point. The signal IBF assumes the binary value 0 when this is not the case. Point registers 66 are coupled between the output of the delay line 51 and the validation input of the comparator 65 in order to produce a time-delay which is equivalent to the delay introduced by the registers 55 to 60, the subtracter 61 and the register 62 and to produce when necessary a signal for validation of the comparator 65 in respect of each image point $P_i$ which is presumed to be in motion by the inter-image difference computation and comparison unit 18.

Although the principle of the present invention has been described in the foregoing in connection with particular examples of construction, it must be understood that the description has been given solely by way of example and does not limit the scope of the invention.

Other alternative forms of construction are in fact possible, in particular by modifying the order of the steps of the method and by employing other structures, especially in order to provide the density-filtering device.

Furthermore, the invention is not limited to an application of motion detectors for reducing inter-image noise in digital television but offers other potential applications, especially for following moving targets with television cameras.

What is claimed is:

1. A method for detection of moving points in a television image for digital television systems providing bit-rate compression, with conditional-replenishment, comprising the steps of computing a luminance and/or chrominance gradient indicator ($I_g$) at each point of the image, computing a threshold value $S(X_o)$ as a function of each gradient obtained, measuring the inter-image luminance and/or chrominance difference of each point of the image, comparing the inter-image difference at each point with the corresponding computed threshold value, applying the result of the comparison to the input of a density-filtering device for detecting the density of moving points in proximity to each scanned point and comparing the density obtained at each scanned point with a predetermined density threshold in order to declare each scanned point in motion when the density corresponding to said point exceeds the predetermined density threshold value.

2. A method according to claim 1, wherein the gradient indicator ($I_g$) is obtained by computing the mean value of the differences at absolute value of the luminances and/or chrominances between each scanned point and its adjacent points.

3. A method according to claim 1, wherein the gradient indicator ($I_g$) is obtained by choosing the greatest difference at absolute value from the differences in luminance and/or chrominance between the scanned point and each of its adjacent points.

4. A method according to claim 3, wherein the gradient indicator ($I_g$) is obtained by comparing at each scanned point in the current image the maximum difference in luminance and/or chrominance between the scanned current point and each of its adjacent points with the maximum difference in luminance and/or chrominance of the point corresponding to the current or scanned point in the preceding image with those of its adjacent points also in the preceding image, and by selecting the smallest maximum difference obtained in either of the two images.

5. A method according to claim 1, wherein the threshold value ($S(X_o)$) is proportional to the computed gradient indicator ($I_g$).

6. A method according to claim 1, wherein the threshold value ($S(X_o)$ is maintained between two minimum and maximum threshold values ($S_{MIN}$), ($S_{MAX}$) which are chosen so as to ensure better coding of the uniform moving areas of the image and to avoid any loss of moving areas which are textured or which have contours.

7. A method according to claim 1, wherein the density of moving points in proximity to each scanned point is measured within a space of size $p \times q$, where p designates the number of points taken into consideration in a first direction of the image and where q designates the number of points taken into consideration in a second direction of the image which is perpendicular to the first.

8. A method according to claim 7, wherein the density at each point is computed by counting the number of points presumed to be in motion, said number being obtained at the input of the density-filtering device within the space of size $q \times p$.

9. A device for detecting moving points in a television image, comprising a threshold-computing device to be employed for detecting the movement of each image point, an inter-image difference computation and comparison unit which is responsive to the threshold value computed by the threshold-computing device, as well as a density-filtering device connected to the output of the motion-detecting device in order to detect the density of moving points in proximity to each scanned point and in order to compare the density obtained around each point with a predetermined density threshold value $S_d$ for defining on the basis of this threshold value the static or moving state of each scanned image point.

10. A device according to claim 9, wherein the density-filtering device comprises a programmable read-only memory which is addressed by a binary combination of states presumed to be fixed or in motion of the scanned point and of the adjacent points as provided by the interimage difference computation and comparison unit and the contents of which are constituted by a density table in order to provide a density value as a function of the binary state of each combination applied to the address inputs of said programmable memory.

* * * * *